United States Patent Office 3,208,978
Patented Sept. 28, 1965

3,208,978
TIN DERIVATIVES OF POLYESTERS
Gustav Weissenberger, Zurich, Switzerland, assignor to Monsanto Company, a corporation of Delaware
No Drawing. Filed Nov. 16, 1961, Ser. No. 152,947
7 Claims. (Cl. 260—75)

It is well known that tin hydrides can be added to reactive double bonds [G. J. M. van der Kerk, J. B. A. Luiyten and J. G. Noltes, Chem. and Ind. 352 (1956); J. Appl. Chem. 7,356 (1957)].

It has been found that, by the additive reaction of organo-tin hydrides with unsaturated polyesters, the corresponding tin derivatives are formed. As a result, the polyesters are modified, and, depending on the circumstances, are also cross-linked.

The addition of organo-tin monohydrides to, for example, the polyester of maleic acid and 1,4-butanediol proceeds according to the equation

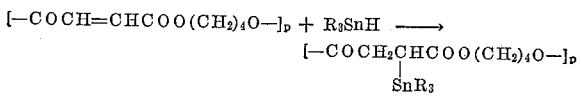

while in the reaction of organo-tin dihydrides, cross-linking may be possible, according to the equation

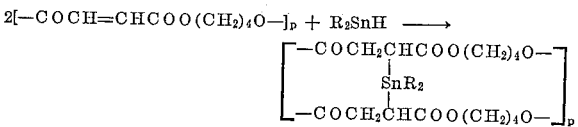

In these formulae R denotes a hydrocarbon radical or a heterocyclic radical, preferably having not more than 18 carbon atoms and more preferably not more than 8 carbon atoms, and $p$ represents the degree of polymerization of the polyester.

The polyester suitable for this reaction can contain one or more olefine double bonds, which may be distributed in the dicarboxylic acid part as well as in the diol part of the polyester molecule. Accordingly, the starting material consists of esters of unsaturated dicarboxylic acids and saturated or unsaturated diols, or of saturated dicarboxylic acids and unsaturated diols. The dicarboxylic acids preferably contain not more than 22 carbon atoms and more preferably not more than 12 carbon atoms, and the diols preferably contain not more than 8 carbon atoms. Olefinic double bonds in the polyesters capable of undergoing an addition reaction, i.e. with an organo-tin hydride, are those double bonds which are terminal or are in α-position to a carbonyl group (or similar activating group, such as cyano, nitro, $-CF_3$ and the like), and such double bonds are called activated double bonds.

Unsaturated dicarboxylic acids which come into question are, for example, maleic acid, methylmaleic, dimethylmaleic, ethylmaleic, phenylmaleic, diphenylmaleic acid, fumaric acid, mesaconic acid, citraconic acid, itaconic acid, vinylmalonic, allylmalonic, benzylidenemalonic acid, allylsuccinic acid, di-, tetra-hydroterephthalic acid, phenylene-diacrylic acid, 2,5-furandicarbonic acid, etc. Examples of diols which are esterified with the above dicarboxylic acids are: 1,2-ethanediol, 1,3-propanediol 1,3-butanediol, 1,4-butanediol, 1,6-hexanediol, 1,4-cyclohexanediol, bis-phenols, etc. Unsaturated diols such as 1,4-butanediol-(2,3), 1,6 - hexenediol - (3,4) 1,6-hexenediol-(1,2), etc. together with saturated dicarboxylic acids such as malonic, succinic, terephthalic acid, etc., are components of suitable polyesters.

Organo-tin hydrides which are suitable for addition to unsaturated polyesters are, for example: dimethyltin dihydride, trimethyltin monohydride, dibutyltin dihydride, tributyltin monohydride, diphenyltin dihydride, triphenyltin monohydride, tricyclohexyltin monohydride, compounds of the formula

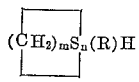

wherein $m$ is an integer from 3 to 7 and R is as defined hereinabove, such as methyl-pentamethylenetin monohydride, etc. These organo-tin hydrides can be prepared in the recognized way from, for example, organo-tin chlorides and $LiAlH_4$. They show a varying reactivity according to the organic substituents which are present. Thus, triphenyltin monohydride reacts essentially easier than, for example, tributyltin monohydride.

It has been found that the addition reaction can be accelerated by radical formers. Azo-bis-isobutyronitrile is a very suitable catalyst as can be seen from Table 1.

The polyesters are modified by addition of organo-tin hydrides. In general, the softening point rises with the introduced tin content. The polyester of maleic acid and 1,4-butanediol which is liquid at room temperature, reaches for example, a softening point of about 70–120° C. according to the tin content.

The reaction is carried out simply by heating the calculated stoichiometric proportions of the reactants, preferably in a solvent such as chlorobenzene for convenience, and preferably with the addition of a catalyst, e.g. azo-bis-isobutyronitrile. The organo-tin hydride is calculated with respect to the olefinic double bonds present, taking into account that dihydrides can react with two double bonds by cross-linking of the polyester molecules.

As a rule, the cross-linking occurs at higher temperatures than the preceding addition of the organo-tin hydrides. The tin-containing polyesters can, if desired, be purified by dissolving in chloroform and precipitating with methanol.

EXAMPLE 1

To a solution of 5.1 g. of polyester of maleic acid and 1,4-butanediol (0.03 mol) in 40 ml. of monochlorobenzene are added, 8.7 g. of tributyltin hydride (0.03 mol) and 0.12 g. of 2,2-di-(cyano)-2,2′-azopropane (azo-bis-isobutyronitrile) as a catalyst. The solution is heated at 70° C. for 6 hours, concentrated and then the polyester precipitated with methanol. The precipitation of the reaction product is repeated three times for purification.

The tin content is 3.8%, i.e., each sixth to seventh molecule unit of the polyester has added a molecule of tributyltin hydride. The maleic-1,4-butanediol-polyester which was liquid at the start became solid and shows a softening point of 92–98° C.

EXAMPLE 2

Equimolar amounts of triphenyltin hydride and polyesters of maleic acid and 1,4-butanediol in chlorobenzene (20–25% solution) are heated to 70° C. In one of the reaction series is added 0.75% of azo-bis-isobutyronitrile (AIBN) as a catalyst, while the other reaction series is conducted without a catalyst for comparison. At defined time intervals a sample is taken from the reaction mixture, purified by precipitating four times with methanol and analyzed for tin content.

The results are shown in the following Table 1, the theoretically possible tin content being 22.8%.

Table 1

| No. | Reaction time, min. | Temperature, °C. | Percent Tin content | |
|---|---|---|---|---|
| | | | With AIBN | Without AIBN |
| 1 | 5 | 70 | 5.85 | 2.2 |
| 2 | 10 | 70 | 17.15 | 4.7 |
| 3 | 15 | 70 | 19.6 | |
| 4 | 20 | 70 | 20.4 | |
| 5 | 30 | 70 | 20.2 | 4.9 |
| 6 | 40 | 70 | 20.1 | 6.4 |
| 7 | 50 | 70 | 20.2 | |
| 8 | 60 | 70 | 20.3 | 6.45 |
| 9 | 70 | 70 | 20.4 | |
| 10 | 80 | 70 | 20.1 | 6.72 |
| 11 | 100 | 70 | | 7.0 |

The addition of the organo-tin hydrides can also be followed by observing the infra-red absorption bands at 1645 cm.$^{-1}$.

EXAMPLE 3

To a solution of 2.2 g. of polyester of fumaric acid and 1,4-butanediol (0.13) mol in 50 ml. of chlorobenzene are added 5.5 g. of triphenyltin hydride (0.015 mol) and 58 mg of azo-bis-iso-butyronitrile. The solution is heated at 85–100° C. for 6 hours, concentrated and then the polyester precipitated with methanol.

A product having a tin content of 21% is obtained (theoretical amount 22.8%).

What is claimed is:
1. An olefinically unsaturated polyester which is the reaction product of a dihydric alcohol and a dibasic acid and to which has been added to at least one double bond $R_nSnH_{4-n}$ wherein R is a hydrocarbon radical having not more than 8 carbon atoms and $n$ is an integer from 2 to 3.

2. A polyester of claim 1 wherein $n$ is 3.
3. A polyester of claim 1 wherein $n$ is 2 and said $$R_nSnH_{4-n}$$

has been added to two polymer chains.

4. A polyester of claim 1 wherein said polyester is an ester of an α, β-unsaturated dicarboxylic acid having not more than 12 carbon atoms and a diol having not more than 8 carbon atoms.

5. A polyester of claim 4 wherein said acid is maleic acid, said diol is an alkane diol having not more than 8 carbon atoms, R is alkyl having not more than 8 carbon atoms, and $n$ is 3.

6. A polyester of claim 4 wherein said acid is maleic acid, said diol is an alkane diol having not more than 8 carbon atoms, R is an aromatic hydrocarbon radical having not more than 8 carbon atoms, and $n$ is 3.

7. A polyester of claim 4 wherein said acid is fumaric acid, said diol is an alkane diol having not more than 8 carbon atoms, R is an aromatic hydrocarbon radical having not more than 8 carbon atoms, and $n$ is 3.

References Cited by the Examiner

UNITED STATES PATENTS 2,715,111   8/55   Weinberg _____ 260—429.7

OTHER REFERENCES

G. J. M. van der Kerk et al., Chem. and Ind. 352 (1956). G. J. M. van der Kerk et al., J. Appl. Chem. vol. 7, p. 356.

LEON J. BECOVITZ, *Primary Examiner.*

LOUISE P. QUAST, *Examiner.*

UNITED STATES PATENT OFFICE
CERTIFICATE OF CORRECTION

Patent No. 3,208,978            September 28, 1965

Gustav Weissenberger

It is hereby certified that error appears in the above numbered patent requiring correction and that the said Letters Patent should read as corrected below.

Column 1, line 27, for "$R_2SnH \rightarrow$" read -- $R_2SnH_2 \rightarrow$ --; column 3, line 26, for "(0.13)" read -- (0.013) --.

Signed and sealed this 31st day of May 1966.

(SEAL)
Attest:

ERNEST W. SWIDER
Attesting Officer

EDWARD J. BRENNER
Commissioner of Patents